United States Patent [19]
Desgagné

[11] Patent Number: 6,047,191
[45] Date of Patent: Apr. 4, 2000

[54] METHOD OF SELECTING A VOICE CHANNEL IN A RADIO TELECOMMUNICATIONS NETWORK

[75] Inventor: Michel Desgagné, St. Hubert, Canada

[73] Assignee: Telefonaktiebolaget LM Ericsson, Stockholm, Sweden

[21] Appl. No.: 08/801,946

[22] Filed: Feb. 14, 1997

[51] Int. Cl.$^7$ .................................................. H04Q 7/26
[52] U.S. Cl. .......................... 455/455; 455/63; 455/67.3; 455/513; 455/516
[58] Field of Search ...................... 455/455, 513, 455/516, 63, 67.3, 134, 135, 136, 436, 442, 525; 370/342

[56] References Cited

U.S. PATENT DOCUMENTS

| | | | |
|---|---|---|---|
| 4,550,443 | 10/1985 | Freeburg | 455/525 |
| 5,119,397 | 6/1992 | Dahlin et al. | 375/5 |
| 5,159,593 | 10/1992 | D'Amico et al. | 370/95.3 |
| 5,355,514 | 10/1994 | Borg | 455/33.1 |
| 5,375,123 | 12/1994 | Andersson et al. | 370/95.1 |
| 5,493,693 | 2/1996 | Tanaka et al. | 455/33.1 |
| 5,506,869 | 4/1996 | Royer | 455/67.3 |
| 5,507,008 | 4/1996 | Kanai et al. | 455/513 |
| 5,542,097 | 7/1996 | Ward et al. | 455/437 |
| 5,594,943 | 1/1997 | Balachandran | 455/513 |
| 5,603,088 | 2/1997 | Gorday et al. | 455/67.3 |
| 5,603,092 | 2/1997 | Stjernholm | 455/63 |
| 5,606,727 | 2/1997 | Ueda | 455/513 |
| 5,669,060 | 9/1997 | Guimont | 455/513 |
| 5,697,055 | 12/1997 | Gilhousen et al. | 455/33.2 |
| 5,754,542 | 5/1998 | Ault et al. | 370/342 |

FOREIGN PATENT DOCUMENTS

| | | |
|---|---|---|
| 0 504 122 A2 | 9/1992 | European Pat. Off. . |
| WO 90/13187 | 11/1990 | WIPO . |
| WO 93/06683 | 4/1993 | WIPO . |
| WO 96/29837 | 9/1996 | WIPO . |

*Primary Examiner*—Daniel S. Hunter
*Assistant Examiner*—Thuan T. Nguyen
*Attorney, Agent, or Firm*—Smith & Danamraj, P.C.

[57] ABSTRACT

A method of selecting a voice channel in a radio telecommunications network. The method begins by seizing a first digital traffic channel (DTC) having a carrier signal strength (C) and an interference strength (I), and calculating an expected ratio of the carrier signal strength to the interference strength (C/I) on the first DTC. From this calculation, it is determined whether the first DTC is disturbed. This is followed by utilizing the first DTC for a call upon determining that the first DTC is not disturbed, and seizing a second voice channel upon determining that the first DTC is disturbed. The second voice channel may be a second DTC or may be an analog voice channel (AVC). If a second DTC is seized, the C/I is determined for the second DTC, and the DTC with the higher C/I is retained. If the second DTC is also disturbed, another reselection and comparison may be performed. Reselections continue until a channel with good C/I is found, or a maximum number of reselections is performed.

19 Claims, 4 Drawing Sheets

METHOD OF SELECTING A VOICE CHANNEL IN A RADIO TELECOMMUNICATIONS NETWORK

BACKGROUND OF THE INVENTION

1. Technical Field of the Invention

This invention relates to radio telecommunication systems and, more particularly, to a method of selecting either a digital traffic channel or an analog voice channel in a digital cellular telecommunications network.

2. Description of Related Art

In existing radio telecommunications networks such as the Digital Advanced Mobile Phone System (D-AMPS), field measurements often show that performance is inferior to the analog Advanced Mobile Phone System (AMPS) in the areas of connection reliability and voice quality. For example, field tests indicate that a call which is set up on a digital traffic channel (DTC) is more than twice as likely to fail than a call on an analog voice channel (AVC). The handoff failure rate for D-AMPS is also higher than the failure rate for AMPS. In addition, the D-AMPS voice quality is perceived to be worse than AMPS at low signal strength and at high interference levels.

Although there are no known prior art teachings of a solution to the aforementioned deficiency and shortcoming such as that disclosed herein, U.S. Pat. No. 5,355,514 to Borg discusses subject matter that bears some relation to matters discussed herein. Borg discloses a method of determining the transmission quality between a mobile station and its serving base station in a mobile radio system. The combined signal strength of the carrier signal and any disturbing signals is first measured. Then, the signal strength of solely the disturbing signals is measured by taking such measurement while the mobile station and serving base station transmitters are shut down. The quotient between these two signal strengths is a measure of connection quality. The carrier-to-interference ratio (C/I) on the serving channel is thus calculated from the equation:

C/I=((C+I)/I)−1.

Thus, Borg discloses a technique to measure the carrier-to-interference ratio (C/I) during a call (i.e., monitor the voice quality). However, Borg does not teach or suggest a method of voice channel reselection in which the expected C/I is calculated before seizing a voice channel to determine whether adequate voice quality will be provided, and reselecting another voice channel if the expected C/I is too low. For an intracell handoff request (i.e., to another voice channel in the same cell), the method of Borg could be utilized to trigger the request. However, Borg does not teach or suggest a method of ensuring that a good voice channel is then selected. In addition, the present invention is triggered by a DTC seizure request, either at handoff or at system access, not by falling C/I. Thus, a review of Borg reveals no disclosure or suggestion of a system or method such as that described and claimed herein.

In order to overcome the disadvantage of existing solutions, it would be advantageous to have a method in a digital or dual-mode radio telecommunications network for improving system performance by determining the expected C/I on a seized digital traffic channel prior to utilizing the channel, and, if the expected C/I is poor, reselecting a DTC or an AVC which will provide improved voice quality. The present invention provides such a method.

SUMMARY OF THE INVENTION

As utilized herein, the generic term "voice channel" refers to both digital traffic channels (DTCs) and analog voice channels (AVCs). The specific terms "DTC" and "AVC" are utilized to refer to digital traffic channels and analog voice channels respectively.

In one aspect, the present invention is a method of selecting a voice channel in a radio telecommunications network. The method begins by seizing a first target DTC having a carrier signal strength (C) and an interference strength (I), and calculating an expected ratio of the carrier signal strength to the interference strength (C/I) on the first target DTC. From this calculation, it is determined whether the first target DTC is disturbed. This is followed by utilizing the first target DTC for a call upon determining that the first target DTC is not disturbed, and seizing a second target DTC upon determining that the first target voice channel is disturbed. Additional channel reselections may be performed until either a channel with good C/I is found, or a maximum number of channel reselections is reached. If a DTC with good C/I cannot be found, an AVC may be seized instead.

In another aspect, the present invention is a method of selecting a target voice channel for a mobile station operating on a serving voice channel in a radio telecommunications network during intracell handoff. When the mobile station requires an intracell handoff, the method begins by seizing a target DTC having a carrier signal strength (C) and an interference strength (I). This is followed by calculating an expected ratio of the carrier signal strength to the interference strength (C/I) on the target DTC, and determining the C/I on the serving DTC. The method then determines whether the C/I on the target DTC is higher than the C/I on the serving DTC, and hands off the mobile station to the target DTC, only upon determining that the C/I on the target DTC is higher than the C/I on the serving DTC. If a target DTC with good C/I cannot be found, an AVC may be seized instead.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

Figure 1:
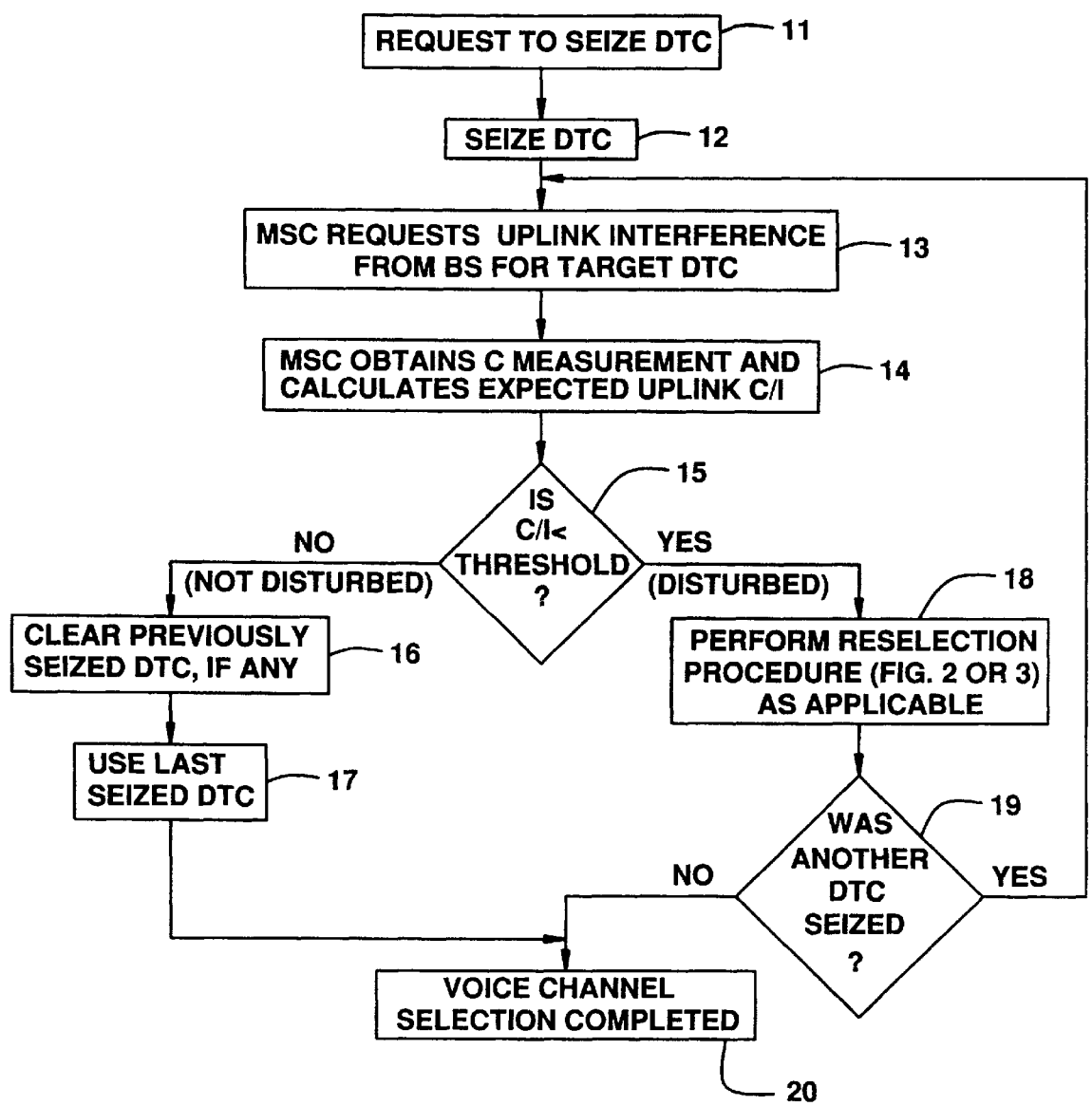
FIG. 1 is a flow chart illustrating the steps involved in selecting a voice channel in accordance with the teachings of the present invention.

FIG. 1 is a flow chart illustrating the steps involved in selecting a voice channel in accordance with the teachings of the present invention. The process begins at step 11 where there is a request to seize a digital traffic channel (DTC). This may occur at originating access, terminating access, intercell handoff, or intracell handoff. The process is applicable to all types of call setup and all types of handoff. For example, it can be utilized at call setup (access) on a digital control channel (DCCH) and on an analog control channel (ACC). The process can also be utilized at intercell handoff when signal strength is low and there is a need to change cells and seize a new voice channel. It is also applicable for intracell handoff if voice quality is poor on the assigned DTC, and the MS is switched to a new DTC in the same cell. Likewise, the process may be utilized for improved overlay/underlay cell handoff.

At step 12 a DTC is seized. Once a DTC is assigned and a call is in progress, the present invention obtains the uplink C/I, and uses the C/I to improve D-AMPS performance through an improved voice channel selection process. Essentially, before assigning and using a DTC, the method predicts the voice quality of the target DTC. The voice quality is predicted from the ratio (C/I) of the carrier signal strength (C) and the interference signal strength (I). The C/I ratio provides only a prediction of voice channel quality since there may be changes by the time the channel is actually used.

Different modules in the system are requested to measure and provide the C and the I for the calculation of C/I. At step 13, the mobile switching center (MSC) requests the base station (BS) to provide a measurement of the uplink interference on the target DTC. Whenever a DTC is idle, the base station constantly performs a process called idle channel supervision in which the base station measures the I on the idle channel.

At step 14, the process measures the C and calculates an expected uplink C/I ratio based upon these measurements. The C may be obtained in different ways for different traffic cases. At call setup, the C is obtained from the control channel at access. A mechanism in the control channel measures the signal strength when the MS is accessing the system at originating or terminating access. The mobile switching center (MSC) receives the signal strength information and estimates the C. At intercell handoff (Digital to Digital), the C is obtained from a Location and Verification Module (LVM) in the target base station during MS presence verification or at another specified time. At intercell handoff (Analog to Digital), the C is obtained from a signal strength receiver (SSR) module in the target base station. At intracell handoff and overlay/underlay handoff (both A/D and D/D), the C is obtained from the serving AVC or DTC. The AVC or the DTC measures the signal strength and sends it to the MSC. The MSC receives the signal strength information and estimates the C on the target channel.

A compensation is then performed on the measured C to account for the mobile station power level change. This compensation is reflected in the following equation:

$$C_{comp}(dBm) = C_{measured}(dBm) + (\text{Initial mobile transmitted power on target channel (dBm)} - \text{mobile transmitted power during the C measurement (dBm)})$$

Therefore, the expected C/I is:

$$C/I_{expected}(dB) = C_{comp}(dBm) - I_{Target\ Channel}(dBm).$$

Figure 2:
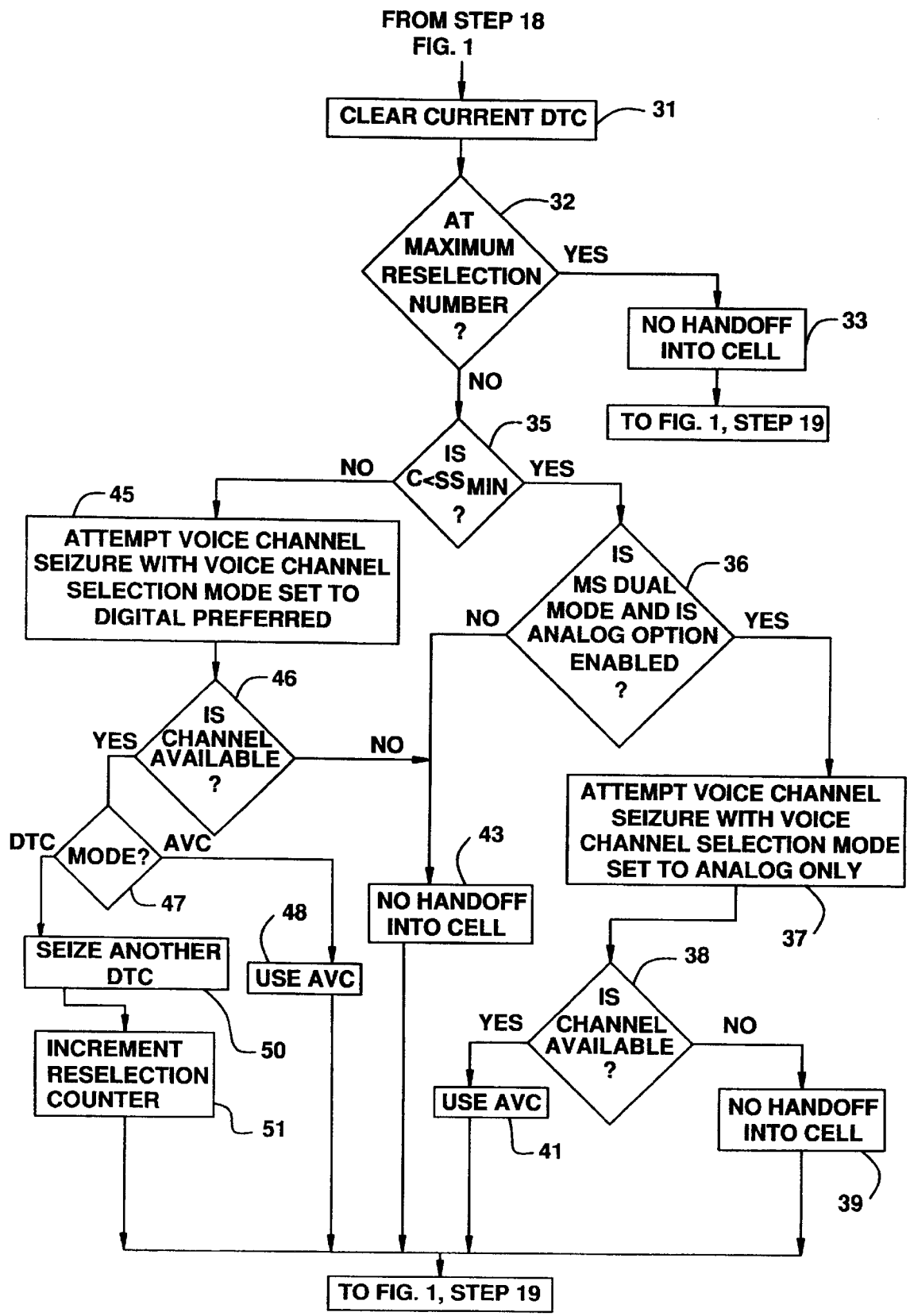
FIG. 2 is a flow chart illustrating the steps of the method of the present invention when reselecting a voice channel at handoff when a seized digital traffic channel (DTC) is disturbed.
Figure 3:
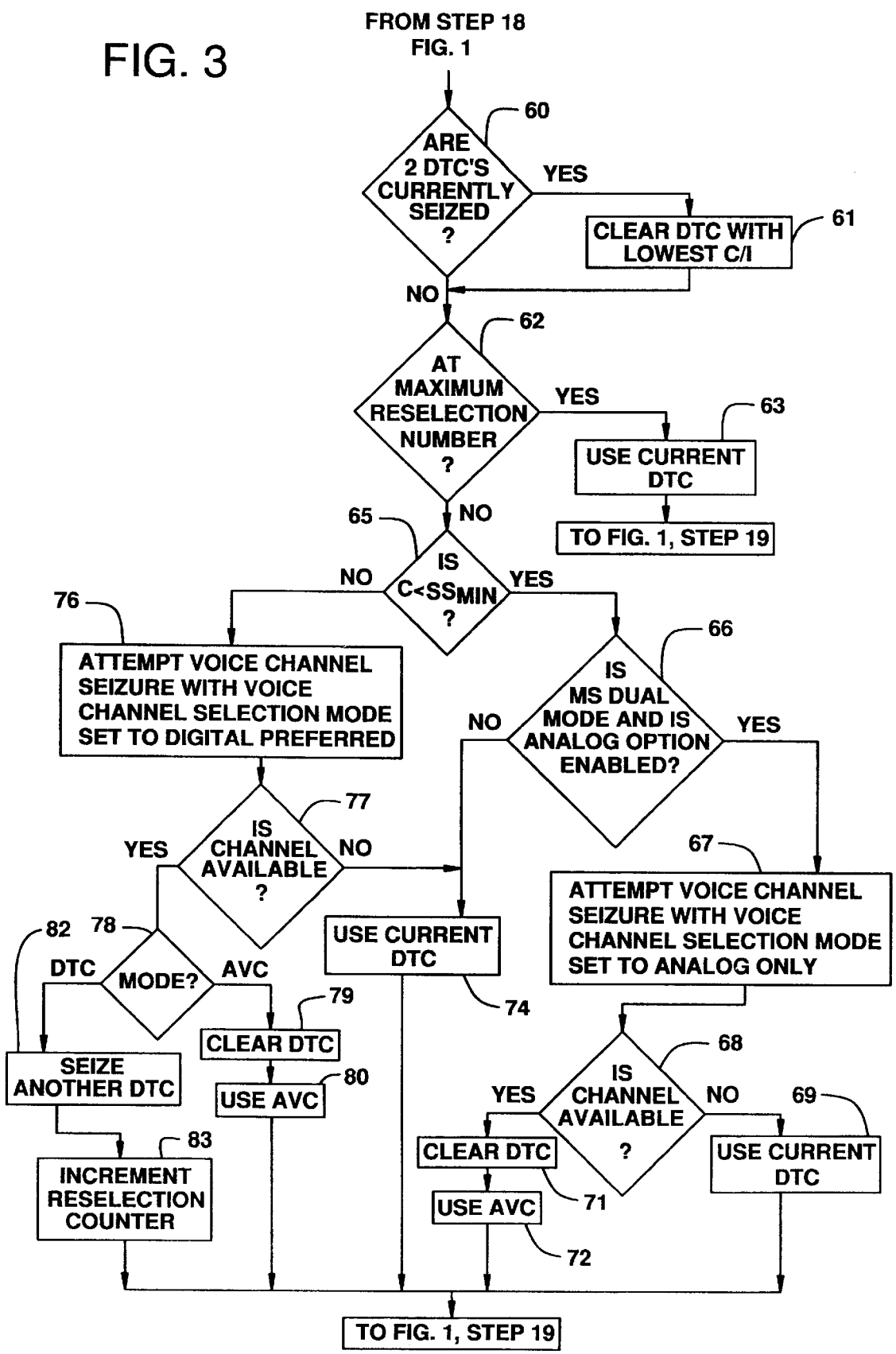
FIG. 3 is a flow chart illustrating the steps of the method of the present invention when reselecting a voice channel at originating or terminating access when a seized DTC is disturbed.

At step 15, it is determined whether or not the C/I for the target DTC is less than a predetermined acceptable threshold (i.e., whether the target DTC is disturbed). Based on the C/I calculation, the DTC is utilized if the C/I is at a level that will provide acceptable voice quality. If the C/I is not acceptable, a voice channel reselection process is performed which attempts to find an undisturbed DTC. Thus, if the C/I is above the threshold, and the target DTC is not disturbed, the process moves to step 16 where any previously seized DTC is released. The process then moves to step 17 and utilizes the last seized (i.e., the acceptable) DTC. Thereafter, the process moves to step 20 where the voice channel selection process is completed. If, however, the C/I is below the threshold in step 15, the process moves to step 18 and performs a voice channel reselection procedure in accordance with the teachings of the present invention. FIG. 2 illustrates the reselection procedure utilized at intercell, intracell, or overlay/underlay handoff. FIG. 3 illustrates the reselection procedure utilized at originating or terminating access.

Following the channel reselection procedure, it is determined at step 19 whether or not another DTC was seized in the reselection procedure. If another DTC was seized, the process returns to step 13. If another DTC was not seized, the process moves to step 20 where the voice channel selection process is completed.

Referring now to FIG. 2, there is shown a flow chart illustrating the steps of the method of the present invention when reselecting a voice channel at handoff when a seized target DTC is disturbed. If the C/I on the target DTC is below the predetermined threshold in step 15, and a handoff is required, the process moves to FIG. 2 and performs the following voice channel reselection procedure. At step 31, the current DTC is cleared so that it becomes available for other calls. The operator may program a maximum number of voice channel reselections that the system is allowed to perform. At step 32, it is determined whether the maximum reselection number has been reached. If so, the process moves to step 33 where no handoff is allowed. The reselection process is then stopped at step 34. If, however, the maximum number of channel reselections has not been reached, the process moves to step 35 where it is determined whether or not the carrier signal strength C on the target DTC is less than the minimum required signal strength ($SS_{min}$), for analyzing the option of selecting an analog voice channel (AVC). The analog option may be enabled or disabled by the system operator for dual-mode systems.

Digital systems generally do not perform as well as analog systems when the signal strength is low. Therefore, if the C/I is bad, and the signal strength is low, then the voice quality is not likely to be improved by changing to another digital traffic channel. In that case, the system should shift the MS to an analog voice channel. Therefore, if C is less than $SS_{min}$, the process moves to step 36 where it is determined whether or not the served mobile station (MS) is a dual-mode MS, and whether or not the analog option is enabled. If both conditions are yes, the process moves to step 37 and attempts to seize an AVC with the voice channel selection mode set to analog only. This may be performed by checking the idle channel list and requesting an AVC. At step 38, it is determined whether there is channel congestion. If a channel is not available, the process moves to step 39 where no handoff is allowed. The process then returns to FIG. 1, step 19. If, however, an AVC is available, the process moves to step 41 and the available AVC is utilized. The process then returns to FIG. 1, step 19.

However, if it is determined at step 36 that either the served MS is not a dual-mode MS, or the system operator has not enabled the analog option, the process moves from step 36 to step 43 where no handoff is allowed. The process then returns to FIG. 1, step 19.

If signal strength is good, but C/I is bad because of high interference on a particular channel, then changing to a different digital channel is likely to improve the voice quality. Therefore, returning to step 35, if it is determined that C is not less than $SS_{min}$, the process moves from step 35 to step 45 and attempts to seize a voice channel with the voice channel selection mode set to digital preferred. At step 46, it is determined whether there is channel congestion. If a channel is not available, the process moves to step 43 where no handoff is allowed. The process then returns to FIG. 1, step 19. If, however, a channel is available, the process moves to step 47 where it is determined whether to select a DTC or an AVC. Digital is preferred, but if no DTC is available, an AVC is selected. The process then moves to step 48 and the available AVC is utilized. The process then returns to FIG. 1, step 19. If, however, a DTC is available, a DTC is seized at step 50. The process then moves to step 51 where the channel reselection counter is incremented. The process then returns to FIG. 1, step 19.

At handoff, after reaching a maximum number of consecutive channel reselections because of multiple disturbed channels, with good signal strength but high interference, the system retains the call on the current voice channel and does not hand off the MS. The probability of losing the call would be higher if the handoff is made.

Total disturbance on a voice channel is, among other things, comprised of interference I, noise, and multipath propagation. Multipath propagation results from the fact that the signal from the BS is able to reach the MS partly through direct signals and partly through signals reflected from buildings, surrounding hills, and the like. The reflected signals are delayed in relation to the direct signals, and the multipath propagation results in increasing the bit error rate (BER). In D-AMPS, there is a mechanism in the MS and the BS to measure the bit error rate (BER). If the C/I is high, but the BER is also high, the high BER is most likely due to multipath propagation. Therefore, an intercell handoff request from the BS to the MSC should be triggered because an intracell handoff is not likely to be effective. However, when the BER is high, and the C/I is low, the high BER is most likely due to high interference levels. In this case, an intracell handoff request from the BS to the MSC should be triggered.

An optional comparison may be made between the C/I on the serving DTC and the C/I on the target DTC for intracell handoffs. The BER on the serving DTC must first be converted to C/I utilizing, for example, known curves to create a conversion table for converting BER to C/I. Alternatively, a technique such as that in U.S. Pat. No. 5,355,514 to Borg may be utilized to determine C/I on the serving DTC, in order to make the comparison. U.S. Pat. No. 5,355,514 to Borg is hereby incorporated by reference herein. The MS is only assigned to the target DTC if the expected target C/I is higher than the serving C/I. Thus, if the comparison shows that the C/I on the serving DTC is higher than the expected C/I on the target DTC, the intracell handoff is not performed.

Referring now to FIG. 3, there is shown a flow chart illustrating the steps of the method of the present invention when reselecting a voice channel at originating or terminating access when a seized DTC is disturbed. The process ensures that the best DTC is always utilized, and no access (either originating or terminating) is prevented by the process. If the C/I on the target DTC is below the predetermined threshold in step 15 (FIG. 1) at an originating or terminating access, the process moves to FIG. 3 and performs the following voice channel reselection procedure. At step 60, it is determined whether or not two DTCs are currently seized. If so, the process moves to step 61 where the DTC with the lowest C/I is cleared. The process then moves to step 62. Likewise, if it is determined at step 60 that two DTCs are not currently seized, the process moves to step 62 where it is determined whether the maximum reselection number has been reached. If so, the process moves to step 63 where the current DTC is utilized. The process then returns to FIG. 1, step 19. If, however, the maximum number of channel reselections has not been reached, the process moves to step 65 where it is determined whether or not the carrier signal strength C is less than the minimum required signal strength ($SS_{min}$) for the option of selecting an analog voice channel (AVC). This analog option may be enabled or disabled by the system operator for dual-mode systems.

If C is less than $SS_{min}$, the process moves to step 66 where it is determined whether or not the served mobile station (MS) is a dual-mode MS, and whether or not the system operator has enabled the analog option. If both conditions are yes, the process moves to step 67 and attempts to seize an AVC with the voice channel selection mode set to analog only. This may be performed by checking the idle channel list and requesting an AVC. At step 68, it is determined whether there is channel congestion. If a channel is not available, the process moves to step 69 where the current DTC is utilized. The process then returns to FIG. 1, step 19. If, however, a channel is available, the process moves to step 71 and clears the DTC. The available AVC is then utilized at step 72. The process then returns to FIG. 1, step 19.

However, if it is determined at step 66 that either the served MS is not a dual-mode MS, or the analog option is not enabled, the process moves from step 66 to step 74 where the current DTC is utilized. The process then returns to FIG. 1, step 19.

Returning to step 65, if it is determined that C is not less than $SS_{min}$, the process moves from step 65 to step 76 and attempts to seize a voice channel with the voice channel selection mode set to digital preferred. At step 77, it is determined whether there is channel congestion. If a channel is not available, the process moves to step 74 where the current DTC is utilized. The process then returns to FIG. 1, step 19. If, however, a channel is available, the process moves to step 78 where it is determined whether to select a DTC or an AVC. Digital is preferred, but if no DTC is available, an AVC is selected. The process then moves to step 79 and clears the DTC. The available AVC is then utilized at step 80. The process then returns to FIG. 1, step 19. If, however, a DTC is available, a DTC is seized at 82. The process then moves to step 83 where the channel reselection counter is incremented. The process then returns to FIG. 1, step 19.

Voice channel reselections are continued until an acceptable channel is found. During each reselection, a seized DTC is compared to a target DTC, and the channel with the best C/I is kept. Therefore, the process eventually determines and seizes the best available channel. The reselection process of the present invention first attempts to reselect a DTC on a different frequency than the DTC with the disturbed C/I. If a DTC on a different frequency is not available, or all available DTCs on different frequencies are also disturbed, the process may then try a DTC on a different time slot on the same frequency.

Figure 4:
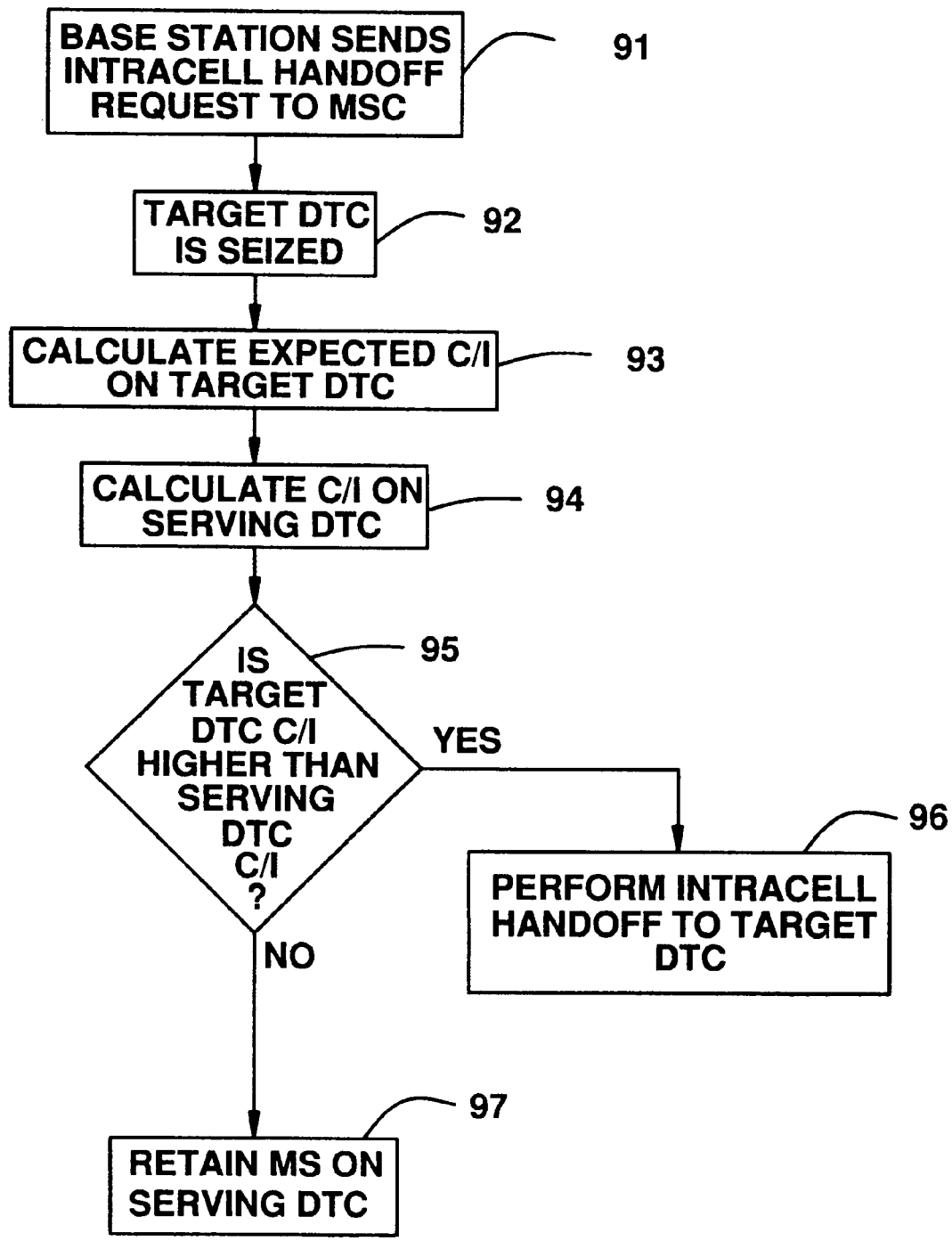
FIG. 4 is a flow chart illustrating the steps of the method of the present invention when selecting a target DTC for intracell handoff for a mobile station operating on a serving DTC in a radio telecommunications network.

FIG. 4 is a flow chart illustrating the steps of the method of the present invention when selecting a target DTC for intracell handoff for a mobile station operating on a serving DTC in a radio telecommunications network. At step 91, the base station sends to the MSC a handoff request which is an intracell handoff request. At 92, the MSC seizes a target DTC, and as described above, calculates the expected C/I on the target DTC at 93. Thereafter, at step 94, the C/I on the serving DTC is calculated. As noted above, the C/I on the serving DTC may be estimated utilizing a BER-to-C/I conversion table, or the C/I may be calculated utilizing the method described in U.S. Pat. No. 5,355,514 to Borg. Once the C/I on the target DTC and the C/I on the serving DTC are obtained, the process moves to step 95 where a comparison is made. If the C/I on the target DTC is higher than the C/I on the serving DTC, the process moves to step 96, and an intracell handoff of the mobile station is performed. If, however, the C/I on the target voice DTC is not higher than the C/I on the serving DTC, the process moves to step 97 where the mobile station is retained on the serving DTC.

It is thus believed that the operation and construction of the present invention will be apparent from the foregoing description. While the method, apparatus and system shown and described has been characterized as being preferred, it will be readily apparent that various changes and modifications could be made therein without departing from

What is claimed is:

1. A method of selecting a voice channel in a radio telecommunications network, said method comprising the steps of:

seizing a first digital traffic channel (DTC) having a carrier signal strength (C) and an interference strength (I);

calculating an expected ratio of the carrier signal strength to the interference strength (C/I) on the first DTC;

determining whether the first DTC is disturbed by determining whether the expected C/I on the first DTC is less than a predetermined threshold;

utilizing the first DTC for a call upon determining that said first DTC is not disturbed;

seizing a second DTC upon determining that said first DTC is disturbed;

calculating an expected ratio of the carrier signal strength to the interference strength (C/I) on the second DTC;

comparing the expected C/I on the first DTC with the expected C/I on the second DTC to determine which DTC has the higher expected C/I; and utilizing the DTC with the higher expected C/I for the call.

2. A method of selecting a voice channel in a radio telecommunications network at call setup, said method comprising the steps of:

estimating the carrier signal strength (C) on a first digital traffic channel (DTC), said estimating step including the steps of:

measuring the signal strength on a control channel when a mobile station is accessing said network at originating or terminating access; and using the measured signal strength on the control channel to predict the carrier signal strength on the first DTC;

seizing the first DTC;

measuring an interference strength (I) on the first DTC;

calculating an expected ratio of the carrier signal strength to the interference strength (C/I) on the first DTC;

determining whether the first DTC is disturbed by determining whether the expected C/I on the first DTC is less than a predetermined threshold;

utilizing the first DTC for a call upon determining that said first DTC is not disturbed; and seizing a target voice channel upon determining that said first DTC is disturbed.

3. The method of selecting a voice channel in a radio telecommunications network of claim 2 wherein said step of calculating an expected ratio of the carrier signal strength to the interference strength (C/I) on the first DTC includes measuring the carrier signal strength with a signal strength receiver module in a target base station at analog-to-digital and analog-to-analog intercell handoff.

4. The method of selecting a voice channel in a radio telecommunications network of claim 1 wherein said step of calculating an expected ratio of the carrier signal strength to the interference strength (C/I) on the first DTC includes:

measuring the carrier signal strength on the serving voice channel prior to intracell handoff; and using the measured carrier signal strength to estimate the carrier signal strength on the first DTC.

5. The method of selecting a voice channel in a radio telecommunications network of claim 1 wherein said step of calculating an expected ratio of the carrier signal strength to the interference strength (C/I) on the first DTC includes measuring an uplink interference strength on the first DTC at a target base station during idle channel supervision.

6. The method of selecting a voice channel in a radio telecommunications network of claim 1 wherein said method is performed during handoff of a mobile station currently operating on said first DTC, and said step of seizing a second DTC upon determining that said first DTC is disturbed includes the steps of:

determining whether the carrier signal strength on said first DTC is less than a predetermined minimum signal strength;

determining whether said mobile station can operate on an analog voice channel (AVC), upon determining that the carrier signal strength on said first DTC is less than the predetermined minimum signal strength; and seizing an AVC upon determining that said mobile station can operate on an AVC.

7. The method of selecting a voice channel in a radio telecommunications network of claim 6 wherein said step of determining whether said mobile station can operate on an AVC includes the steps of:

determining whether the mobile station is a dual-mode mobile station;

determining whether a system operator has enabled an analog option to utilize an AVC; and determining whether an AVC is available, upon determining that the mobile station is a dual-mode mobile station and said analog option has been enabled.

8. The method of selecting a voice channel in a radio telecommunications network of claim 7 further comprising, before the step of determining whether the carrier signal strength on said first DTC is less than a predetermined minimum signal strength, the step of determining whether a maximum number of channel reselections has been reached.

9. The method of selecting a voice channel in a radio telecommunications network of claim 1 wherein said method is performed during handoff of a mobile station currently operating on said first DTC, and said step of seizing a second DTC upon determining that said first DTC is disturbed includes the steps of:

determining whether the carrier signal strength on said first DTC is less than a predetermined minimum signal strength;

determining whether another DTC can be selected for said mobile station, upon determining that the carrier signal strength on said first DTC is not less than the predetermined minimum signal strength; and seizing an available DTC upon determining that another DTC can be selected for said mobile station.

10. The method of selecting a voice channel in a radio telecommunications network of claim 9 wherein said step of determining whether another DTC can be selected for said mobile station includes the steps of:

setting a voice channel selection mode to digital preferred; and determining whether a DTC is available.

11. The method of selecting a voice channel in a radio telecommunications network of claim 10 further comprising, before the step of determining whether the carrier signal strength on said first DTC is less than a predetermined minimum signal strength, the step of determining whether a maximum number of channel reselections has been reached.

12. The method of selecting a voice channel in a radio telecommunications network of claim 1 wherein said method is performed at a mobile station's originating or terminating access on said first DTC, and said step of seizing a target voice channel, upon determining that said first DTC is disturbed, includes the steps of:

determining whether the carrier signal strength on said first DTC is less than a predetermined minimum signal strength;

determining whether said mobile station can operate on an analog voice channel (AVC), upon determining that the carrier signal strength on said first DTC is less than the predetermined minimum signal strength;

utilizing the first DTC, upon determining that said mobile station cannot operate on an analog voice channel; and utilizing an AVC upon determining that said mobile station can operate on an AVC.

13. The method of selecting a voice channel in a radio telecommunications network of claim 12 further comprising, before the step of determining whether the carrier signal strength on said first DTC is less than a predetermined minimum signal strength, the step of:

determining whether two DTCs are currently seized; and clearing one of said two DTCs having the lowest C/I, upon determining that two DTCs are currently seized.

14. The method of selecting a voice channel in a radio telecommunications network of claim 1 wherein said method is performed at a mobile station's originating or terminating access on a DTC, and said step of seizing a target voice channel upon determining that said first DTC is disturbed includes the steps of:

determining whether the carrier signal strength on said first DTC is less than a predetermined minimum signal strength;

determining whether said mobile station can operate on another DTC, upon determining that the carrier signal strength on said first DTC is not less than the predetermined minimum signal strength;

seizing an available second DTC upon determining that said mobile station can operate on another DTC; and seizing an available analog voice channel (AVC) upon determining that said mobile station cannot operate on another DTC.

15. The method of selecting a voice channel in a radio telecommunications network of claim 14 further comprising, before the step of determining whether the carrier signal strength on said first DTC is less than a predetermined minimum signal strength, the steps of:

determining whether two DTCs are currently seized; and clearing one of said two DTCs having the lowest C/I, upon determining that two DTCs are currently seized.

16. A method of selecting a best possible target digital traffic channel (DTC) for a mobile station operating on a serving DTC in a radio telecommunications network, said mobile station requesting an intracell handoff, said method comprising the steps of:

seizing the target DTC;

measuring a carrier signal strength (C) and an interference strength (I) on the target DTC;

calculating an expected ratio of the carrier signal strength to the interference strength (C/I) on the target DTC using the C and I measurements acquired in the measuring step;

determining the current C/I on the serving DTC;

performing a channel-to-channel comparison to determine whether the expected C/I on the target DTC is higher than the current C/I on the serving DTC;

handing off said mobile station to the target DTC, upon determining that the expected C/I on the target DTC is higher than the current C/I on the serving DTC; and maintaining the mobile station on the serving DTC upon determining that the expected C/I on the target DTC is not higher than the current C/I on the serving DTC.

17. The method of selecting a best possible target DTC for a mobile station operating on a serving DTC in a radio telecommunications network of claim 16 wherein said step of determining the C/I on the serving DTC includes the steps of:

measuring bit error rate (BER) on the serving DTC; and utilizing known conversion tables to convert the measured BER to C/I.

18. A method of selecting a voice channel in a radio telecommunications network, said method comprising the steps of:

seizing a first digital traffic channel (DTC) having a carrier signal strength (C) and an interference strength (I);

measuring the carrier signal strength of the first DTC;

calculating a compensated carrier signal strength by adding to the measured carrier signal strength a factor which reflects a difference between an initial power transmitted by a mobile station and a power level transmitted by the mobile station when the carrier signal strength is measured;

calculating an expected ratio of the carrier signal strength to the interference strength (C/I) on the first DTC using the compensated carrier signal strength;

determining whether the first DTC is disturbed;

utilizing the first DTC for a call upon determining that said first DTC is not disturbed; and seizing a second DTC upon determining that said first DTC is disturbed.

19. The method of selecting a best possible target DTC for a mobile station operating on a serving DTC in a radio telecommunications network of claim 16 wherein the step of calculating an expected C/I on the target DTC includes calculating an expected C/I that is below a normal C/I threshold level for intracell handoff in the network, but is higher than the current C/I on the serving DTC.

* * * * *